United States Patent
Lei et al.

(10) Patent No.: US 12,353,574 B2
(45) Date of Patent: Jul. 8, 2025

(54) PAGE PROCESSING METHOD, ELECTRONIC APPARATUS AND NON-TRANSITORY COMPUTER-READABLE STORAGE MEDIUM

(71) Applicant: Baidu Online Network Technology (Beijing) Co., Ltd., Beijing (CN)

(72) Inventors: Xiaoqiang Lei, Beijing (CN); Yunfei Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 674 days.

(21) Appl. No.: 17/278,370

(22) PCT Filed: Jul. 14, 2020

(86) PCT No.: PCT/CN2020/101910
§ 371 (c)(1),
(2) Date: Mar. 22, 2021

(87) PCT Pub. No.: WO2021/098242
PCT Pub. Date: May 27, 2021

(65) Prior Publication Data
US 2022/0114269 A1    Apr. 14, 2022

(30) Foreign Application Priority Data
Feb. 27, 2020   (CN) .......................... 202010125624.1

(51) Int. Cl.
*G06F 21/62*   (2013.01)
*G06F 16/957*   (2019.01)
*G06F 16/958*   (2019.01)

(52) U.S. Cl.
CPC .......... *G06F 21/62* (2013.01); *G06F 16/9577* (2019.01); *G06F 16/958* (2019.01)

(58) Field of Classification Search
CPC .... G06F 21/62; G06F 16/9577; G06F 16/958; G06F 16/957
See application file for complete search history.

(56) References Cited

U.S. PATENT DOCUMENTS

| | | | |
|---|---|---|---|
| 2012/0102392 A1* | 4/2012 | Reesman | G06F 16/9577 715/243 |
| 2016/0299835 A1 | 10/2016 | Opshub | |
| 2017/0257393 A1* | 9/2017 | De Barros | H04L 63/1416 |

FOREIGN PATENT DOCUMENTS

| | | |
|---|---|---|
| CN | 103294781 A | 9/2013 |
| CN | 103778365 A | 5/2014 |

(Continued)

OTHER PUBLICATIONS

WIPO, International Search Report issued on Nov. 13, 2020.
(Continued)

*Primary Examiner* — Matthew T Henning
(74) *Attorney, Agent, or Firm* — HOUTTEMAN LAW LLC

(57) ABSTRACT

Embodiments of the present disclosure relate to technical fields of deep learning and intelligent search, and particularly, provide a page processing method and device, an electronic apparatus and a computer-readable medium. The method includes: determining a plurality of layout object nodes of a page, according to an obtained Hypertext Markup Language (HTML) file; filtering the plurality of layout object nodes according to a preset recall rule to obtain a layout object node satisfying the recall rule, after laying out the plurality of layout object nodes of the page; predicting whether the layout object node satisfying the recall rule is a designated target node; and shielding the designated target node, and generating a shielded page based on remaining layout target nodes after the shielding.

18 Claims, 7 Drawing Sheets

(56) References Cited

FOREIGN PATENT DOCUMENTS

| CN | 106598574 A | 4/2017 |
|---|---|---|
| CN | 109739500 A | 5/2019 |
| CN | 110489636 A | 11/2019 |
| CN | 111353112 A | 6/2020 |

OTHER PUBLICATIONS

Korea Patent Office, KR10-2021-7008647 First Office Action issued on Jan. 12, 2023.
China Patent Office, CN202010125624.1 First Office Action issued on Feb. 15, 2023.
Europe Patent Office, EP20864282.7 First Office Action issued on Jun. 9, 2022.
Japan Patent Office, JP2021-516984 First Office Action issued on May 31, 2022.
Enric Pujol et al., "Annoyed Users: Ads and Ad-Block Usage in the Wild," Internet Measurement Conference, Acm, Oct. 28, 2015, 2 Penn Plaza, New York, NY, pp. 93-106.
Mughees et al., "A First Look at Ad-block Detection: A New Arms Race on the Web," ACM, May 19, 2016, pp. 1-12.
Aderinokun, "Understanding the Critical Rendering Path," BitsOfCode, Jan. 17, 2017.
European Patent Office, Extended European Search Report issued on Nov. 29, 2021 for application No. EP20864282.7.
Enric Pujol et al: "Annoyed Users", Internet Measurement Conference, ACM, Penn Plaza, Suite 701 New York NY 10121-0701 USA, Oct. 28, 2015.
Mughees Muhammad Haris, et al.,: "A First Look at Ad-block Detection: A New Arms Race on the Web", pp. 1-12, May 19, 2016, https://arxiv.org/pdf/1605.05841.pdf.

* cited by examiner

PAGE PROCESSING METHOD, ELECTRONIC APPARATUS AND NON-TRANSITORY COMPUTER-READABLE STORAGE MEDIUM

CROSS-REFERENCE TO RELATED APPLICATIONS

This application is a National Stage of International Application No. PCT/CN2020/101910, filed Jul. 14, 2020, which claims priority to Chinese Patent Application No. 202010125624.1, filed Feb. 27, 2020, both of which are hereby incorporated by reference in their entireties.

TECHNICAL FIELD

Embodiments of the present disclosure relate to technical fields of deep learning and intelligent search, and particularly, to a page processing method and device, an electronic apparatus and a computer-readable medium.

BACKGROUND

With the full popularity of the mobile Internet, more and more sites conduct advertising marketing and application promotion in mobile scenarios. On one hand, due to the limitations of mobile device screens, the influence of advertising and other elements on the user's browsing experience becomes more and more obvious. On the other hand, in order to maximize short-term benefits, a large number of false, pornographic or user-deceptive advertising elements are loaded on a plurality of sites, which seriously affects the user's browsing experience and undermines mobile ecological security.

Therefore, the content of pages displayed on the website should be filtered to provide protection for the ecological security of mobile search, thereby improving the user's browsing experience.

SUMMARY

According to embodiments of the present disclosure, provided are a page processing method and device, an electronic apparatus and a computer-readable medium.

In a first aspect, according to embodiments of the present disclosure, provided is a page processing method, including: determining a plurality of layout object nodes of a page, according to an obtained Hypertext Markup Language (HTML) file; filtering the plurality of layout object nodes according to a preset recall rule to obtain a layout object node satisfying the recall rule, after laying out the plurality of layout object nodes of the page; predicting whether the layout object node satisfying the recall rule is a designated target node; and shielding the designated target node, and generating a shielded page based on remaining layout target nodes after the shielding.

In a second aspect, according to embodiments of the present disclosure, provided is a page processing device, including: a node determination module configured to determine a plurality of layout object nodes of a page, according to an obtained Hypertext Markup Language (HTML) file; a node filtering module configured to filter the plurality of layout object nodes according to a preset recall rule to obtain a layout object node satisfying the recall rule, after laying out the plurality of layout object nodes of the page; a prediction module configured to predict whether the layout object node satisfying the recall rule is a designated target node; and a shielding processing module configured to shield the designated target node, and generate a shielded page based on remaining layout target nodes after the shielding.

In a third aspect, according to embodiments of the present disclosure, provided is an electronic apparatus, including: at least one processor; a memory storing at least one program thereon, when the at least one program is executed by the at least one processor, the at least one processor implements any page processing method above-mentioned; and at least one I/O interface, connected between the at least one processor and the memory, and configured to implement information interaction between the at least one processor and the memory.

In a fourth aspect, according to embodiments of the present disclosure, provided is a computer-readable medium storing a computer program thereon, the computer program is executed by a processor to implement any page processing method above-mentioned.

According to the page processing method and device, the electronic apparatus and the computer-readable medium provided by the embodiments of the present disclosure, a page is processed by combining a recall rule and a node prediction model. For a layout object node that has been filtered according to the recall rule, the node prediction model is used to determine whether the layout object node affects browsing experience, so as to shield the predicted layout object node that affects the browsing experience, thereby optimizing the overall page browsing experience and providing a guarantee for the ecological security of mobile search.

BRIEF DESCRIPTION OF THE DRAWINGS

The accompanying drawings are used to provide a further understanding of embodiments of the present disclosure, and constitute a part of the specification. The accompanying drawings, together with the embodiments of the present disclosure, are used to explain the present disclosure, rather than limiting the present disclosure. The above and other features and advantages will become more apparent to those having ordinary skill in the art from the detailed description of exemplary embodiments with reference to the accompanying drawings. The drawings are as follows.

DETAILED DESCRIPTION

In order to enable those having ordinary skill in the art to better understand the technical solutions of the present disclosure, a page processing method and device, an electronic apparatus and a computer-readable medium according to the present disclosure will be described in detail below in conjunction with the accompanying drawings.

Although exemplary embodiments will be described in more detail below with reference to the accompanying drawings, the exemplary embodiments can be embodied in various forms, and should not be interpreted as limitation to the present disclosure. Rather, these embodiments are provided for facilitating thorough and complete understanding of the present disclosure, and enabling those having ordinary skill in the art to fully understand the scope of the present disclosure.

Figure 1:
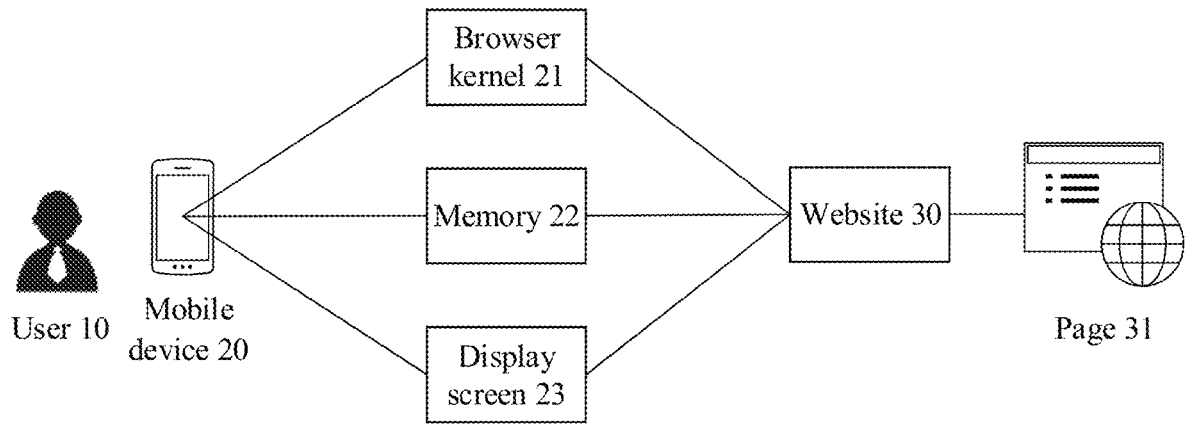
FIG. 1 is a diagram of a page processing architecture according to an embodiment of the present disclosure.

FIG. 1 is a diagram of a page processing architecture according to an embodiment of the present disclosure. As shown in FIG. 1, the architecture may include: a mobile device 20 and a website 30. The mobile device 20 may include a browser kernel 21, a memory 22 and a display screen 23. The website 30 may include a plurality of pages 31.

The mobile device 20 may include, but is not limited to: a personal computer, a smart phone, a tablet computer, a personal digital assistant, a server, and the like. All of them may be provided with various applications (Apps), such as a mailbox app.

According to an embodiment of the present disclosure, a page 31 may include, but is not limited to, a landing page. The landing page may indicate an independent web page and can be used for marketing or advertising activities, e.g., a page that a user or visitor enters by clicking on a searched advertisement or through a paid search channel.

In an embodiment, when a user 10 accesses the website 30 through the mobile device 20, and clicks on a Uniform Resource Locator (URL) of a page 31 in the website 30, the browser kernel 21 initiates a download of a Hypertext Markup Language (HTML) file according to the URL, and parses the downloaded HTML file to obtain a Document Object Model (DOM) tree. At the same time, when a Cascading Style Sheets (CSS) and a JavaScript (JS) file and other resource links on the HTML file are obtained by parsing, downloads of the CSS file and the JS file are initiated, and the downloaded CSS file and JS file are stored in the memory 22.

Due to the rapid change of website behaviors, it is impossible to list all types and pages through setting a rule set. In addition, not all advertisements affect the user's browsing experience. When an advertisement element is in a position that does not affect browsing the main content of the page and has no inducement or other behavior, it is a normal commercial behavior. If a large number of normal commercial behaviors are disrupted mistakenly, it will also destroy the normal Internet ecology. However, many current solutions cannot distinguish the advertisements such as the above normal commercial behaviors from the advertisements that affect the user's browsing experience. If page elements in the website are filtered based on the rule set and the rule set is too large, a loading speed of a web page will be significantly affected.

According to a page processing method provided by the embodiments of the present disclosure, before the display screen 23 of the mobile device 20 displays the page 31, in a rendering stage of the browser kernel 21, types of page elements in the page 31 are intelligently recognized, and a page element that affects the use's browsing experience is automatically shielded; and after the page 31 has been rendered, the user 10 will see an optimized page. As a result, the user's browsing experience is greatly improved and a guarantee is provided for the ecological security of mobile search.

All of the following embodiments can be applied to the system architecture in this embodiment. For concise description, the following embodiments may refer to and quote each other.

Figure 2:
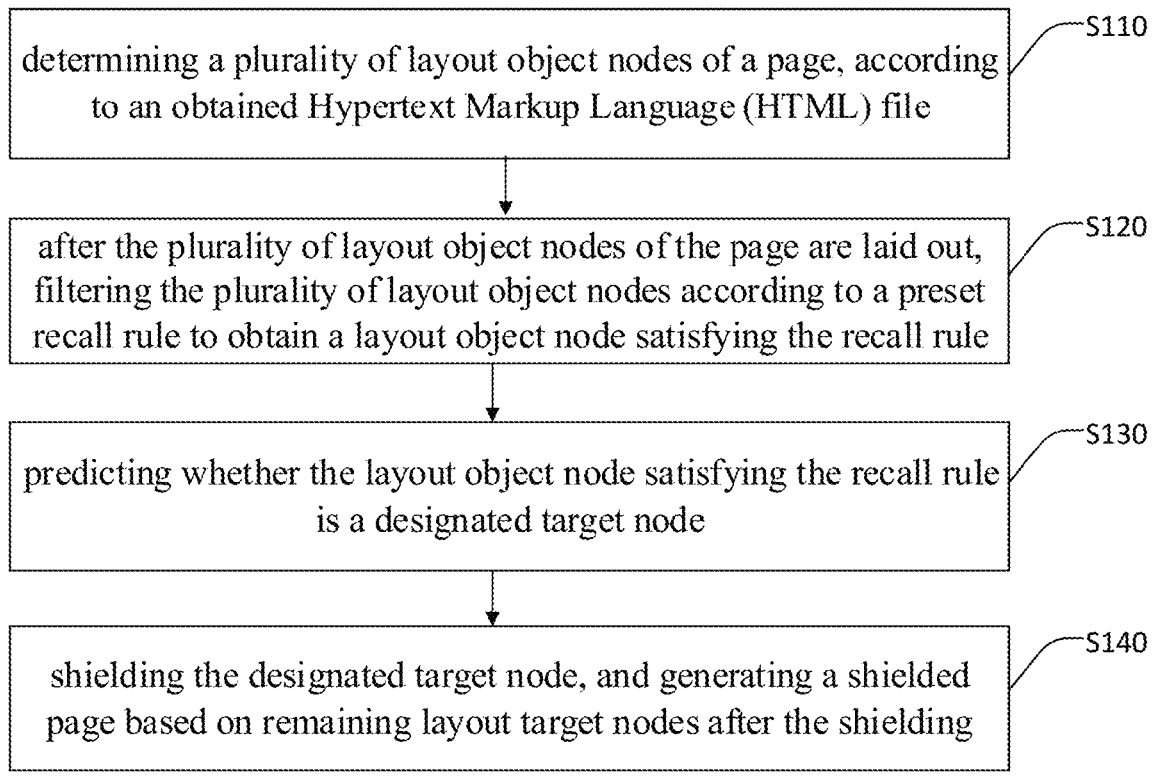
FIG. 2 is a flowchart of a page processing method according to an embodiment of the present disclosure.

FIG. 2 is a flowchart of a page processing method according to an embodiment of the present disclosure. As shown in FIG. 2, the page processing method may include the following steps.

In step S110, a plurality of layout object nodes of a page are determined, according to an obtained Hypertext Markup Language (HTML) file.

In step S120, after the plurality of layout object nodes of the page are laid out, the plurality of layout object nodes are filtered according to a preset recall rule to obtain a layout object node satisfying the recall rule.

In step S130, it is predicted whether the layout object node satisfying the recall rule is a designated target node.

In step S140, the designated target node is shielded, and a shielded page is generated based on remaining layout target nodes after the shielding.

According to the page processing method in the embodiments of the present disclosure, the page is processed by combining the recall rule and the node prediction model. It is determined by the node prediction model that whether a layout object node that has been filtered according to the recall rule affects the browsing experience, and the predicted layout object node that affects the browsing experience is shielded to generate a page after the shielding processing, thereby optimizing the overall page browsing experience and providing a guarantee for the ecological security of mobile search.

In the embodiments of the present disclosure, since the process of processing a web page by a rendering kernel is very complicated, in a view of the perspective of processing performance and user's experience, it is extremely important to choose an appropriate time to hide the target node. The layout of a layout object node represents the process of arranging and calculating the width, height, position and other geometric information of the layout object node. If advertisement recognition is simply performed every time the overall layout of the page is completed, and the entire page is re-laid out, the recognition can be completed. However, since the web page needs to be laid out dozens or even hundreds of times when it is displayed, and the entire page needs to be traversed to identify the target node, the traversal and re-layout will take time and will have a very large impact on the loading time of the entire page, which directly leads to slower loading of the entire web page.

Therefore, in order to achieve the best performance and user's experience, according to the page processing method provided by the embodiments of the present disclosure, the entire page may not be traversed, and the entire page may not be re-laid out, but a partial layout may be actively triggered. In some embodiments, in the above step S120, after the plurality of layout object nodes of the page are laid out, the preset recall rule may be used to filter the layout object nodes.

That is to say, in the embodiments of the present disclosure, when each node on the page is laid out, its own layout method will be called, so as to avoid traversing the DOM tree. After the layout of the node is completed, if the node is identified as a target node that affects the browsing experience, the target node is shielded, for example, the state of the target node is set to hidden. Further, a kernel layout state is reset, and a kernel re-layout is initiated actively, so as to cause the node to be laid out directly locally, avoiding a re-layout of the entire page.

In an embodiment, step S110 may specifically include the following steps. In step S21, the HTML file is parsed to obtain a Document Object Model (DOM) and the Cascading Style Sheets (CSS). In step S22, the CSS is parsed to obtain style data of an HTML element node in the DOM. In step S23, the plurality of layout object nodes of the page are determined according to HTML element nodes in the DOM that need to be rendered and style data thereof.

Each layout object node corresponds to an HTML element node that needs to be rendered, and the style data of each layout object node is identical to that of the corresponding HTML element node.

In this embodiment, the Document Object Model (DOM) may be a DOM of a tree structure, i.e., the DOM tree; the plurality of layout object nodes may be nodes in a Layout Object tree; and after the Layout Object tree is established and laid out, a node of the Layout Object tree may have a series of attribute information such as coordinates, width, and height.

That is, in this embodiment, each node in the Layout Object tree corresponds to an HTML element node in the DOM that needs to be rendered, and a CSS attribute object used for describing the HTML element node in the DOM tree can be set to the layout object node in the newly created Layout Object tree, so that the layout object node in the Layout Object tree can be drawn according to the style data in the CSS.

In an embodiment, if the HTML file is parsed and a script file link is obtained, before step S23, the method may further include the following steps. In step S31, a script file corresponding to the script file link is downloaded and executed to obtain an HTML element node corresponding to the script file. In step S32, the HTML element node corresponding to the script file is determined as the layout object node satisfying the recall rule.

That is, in some embodiments, after determining the plurality of layout object nodes of the page, the page processing method may further include: if the plurality of layout object nodes include a layout object node loaded through a script file, the layout object node loaded through the script file is determined as the layout object node satisfying the recall rule.

In this embodiment, since most of target nodes affecting the browsing experience are dynamically loaded by JS, the HTML element node corresponding to the script file may be determined as the layout object node satisfying the recall rule according to the characteristic that the node is loaded by JS, so as to initially filter nodes to be identified. As a result, the re-layout of nodes can be triggered by asynchronously loaded JS resources, which effectively reduces the time taken for subsequent predicting to identify the nodes affecting the browsing experience by using the node prediction model.

Figure 3:
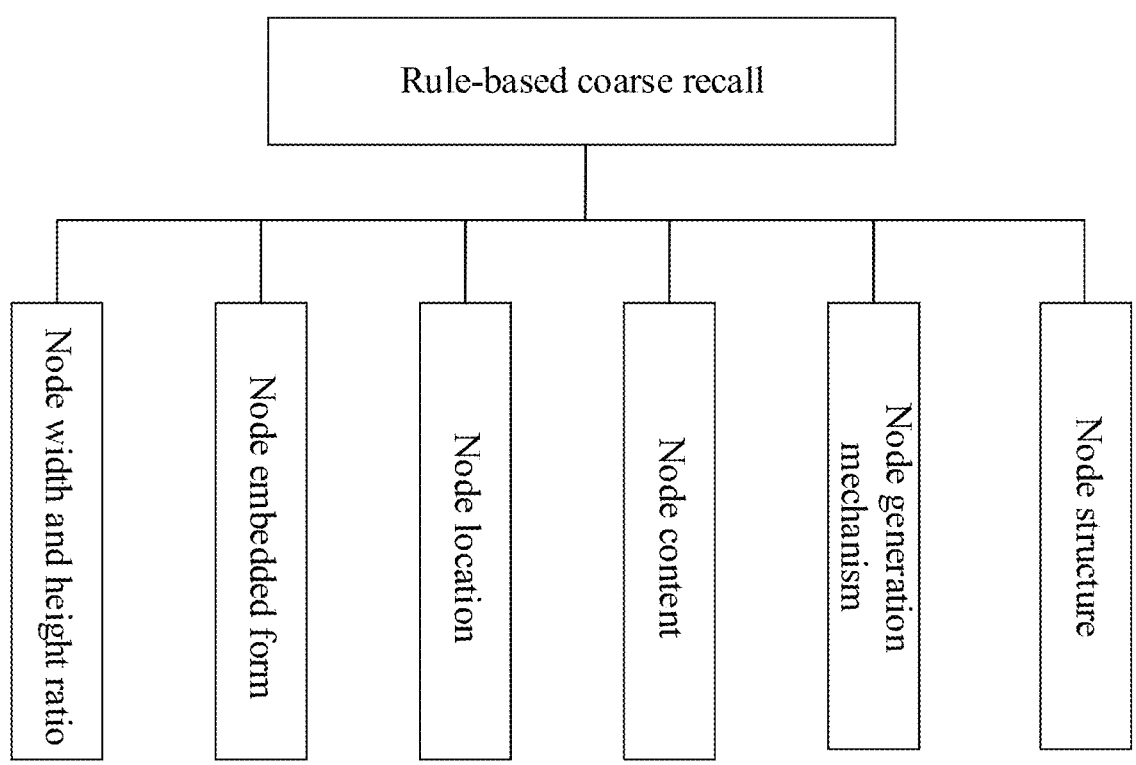
FIG. 3 is a schematic diagram of a recall rule according to an exemplary embodiment of the present disclosure.

FIG. 3 shows a schematic diagram of a recall rule according to an exemplary embodiment of the present disclosure. In the embodiments of the present disclosure, that the layout object nodes are filtered by using the preset recall rule may be referred to as a rule-based coarse recall.

As shown in FIG. 3, in the rule-based coarse recall, a node recall condition may be set according to a node width and height ratio, a node embedded form, a node location characteristic, node content, a node generation mechanism, and a node structure, etc.

That is, the recall rule may include: a rule preset according to at least one of the node width and height ratio, the node embedded form, the node location characteristic, the node content, the node generation mechanism, or the node structure.

In one embodiment, step S120 may specifically include the following steps. In step S41, the plurality of layout object nodes of the page are laid out to obtain attribute information of the layout object nodes that have been laid out. In step S42, it is determined whether the attribute information satisfies the node recall condition defined in the recall rule. In step S43, a layout object node satisfying the node recall condition is determined as the layout object node satisfying the recall rule.

In an example, a rule which is set according to the node width and height ratio includes determining a node of which a height proportion is less than a height proportion threshold and/or a node of which a width proportion is less than a width proportion threshold as a node satisfying the recall rule. In this example, nodes that affect the browsing experience rarely occupy the entire screen, and are mostly displayed on the page in a form of interspersed or floating. For example, the probability that a node of which the height occupies 75% of a screen height is not the target node is very high, and child nodes of other nodes of which the width proportions are less than the width proportion threshold can be filtered out.

In an example, a rule which is set according to the node embedded form includes:

determining a node in a specified embedded form as the node satisfying the recall rule. For example, according to data analysis, it has been found that an inline frame (iframe) node is a common parasitic site for the target node, and the node contains embedded data of most advertisers. Therefore, a node with the iframe is also regarded to be included in a suspected target node set.

In an example, a rule which is set according to the node location characteristic includes: determining a node of which the node location characteristic includes a floating type as the node satisfying the recall rule. In this example, the target node has a fixed, embedded or floating form relative to the page. A floating target node has the worst impact on the browsing experience, and it will block effective information and force the user to close it. Therefore, a floating node is also regarded to be included in the suspected target node set.

In an example, a rule which is set according to the node content includes: determining a node having a specified type of content as the node satisfying the recall rule. In this example, if text, pictures and interactive content in a node are relatively rich, it is highly likely that the node is a non-target node.

In an example, a rule which is set according to the node generation mechanism includes: determining a node having a specified generation mechanism as the node satisfying the recall rule. In this example, it is assumed that the nodes in the page include a node generated by HTML source codes and a node dynamically generated by JS. The node generated by JS is flexible and changeable. Most of the main content of the page are generated in HTML, and other content such as advertisements and related recommendations that need to be dynamically changed are generated with JS. Therefore, the node generated by JS is highly likely to be the target node.

In an example, a rule which is set according to the node structure includes: determining a node having a specified structure as the node satisfying the recall rule. In this example, a structural characteristic of the node in the DOM tree may also be used as a basis for filtering. For example, in the structure of the DOM tree, most of nodes that have only plain text are non-target nodes (i.e., nodes that do not satisfy the recall rule); and a block-level node in a form of div/a/img is highly likely to be a node promoted by means of pictures.

According to the page processing method provided by the embodiments of the present disclosure, in the rule-based coarse recall, as long as the node satisfies a node recall condition defined by any one rule included in the recall rule, it may indicate that the node has a characteristic of a suspected target node, and a subsequent target node judgment process may be performed. If all the rules are not satisfied, the node is regarded as a non-target node. Therefore, a large number of normal nodes that do not affect the browsing experience can be filtered out through one screening strategy of the recall rule.

In one embodiment, before the above step S130, the following steps may be further included.

In step S51, the layout object node satisfying the recall rule is determined as a layout object node obtained through an initial filtering, and a node state of the layout object node obtained through the initial filtering is determined.

In step S52, after all the layout object nodes of the page are laid out, a layout object node of which the node state has changed is obtained.

In step S53, the layout object node of which the node state has changed is further filtered according to the preset recall rule.

In step S54, the layout object node obtained through the initial filtering and a layout object node obtained through the further filtering are determined as the layout object node satisfying the recall rule.

In this embodiment, in a node layout process, due to the interdependence between some nodes, when the nodes are first laid out, accurate node visual information has not been calculated, and thus these nodes are difficult to satisfy the rough recall rule. Therefore, after the overall layout is completed, it is necessary to check a node of which the node state (such as node visual information) has changed, and re-implement the rule-based coarse recall for the node, to retrieve a plurality of nodes satisfying the recall rule after their node states have changed in the layout process according to a recheck mechanism, so as to recall more nodes satisfying the recall rule and prevent the target node from being missed.

In one embodiment, Step S130 may specifically include the following steps.

In step S61, a node characteristic of the layout object node satisfying the recall rule is calculated, according to attribute information of the layout object node satisfying the recall rule.

In step S62, the node characteristic is processed by using a preset node prediction model, to obtain a probability value that the layout object node satisfying the recall rule is the designated target node.

In step S63, it is determined whether the layout object node satisfying the recall rule is the designated target node according to the probability value.

In this embodiment, a machine learning model may be used to determine whether the node satisfying the recall rule is the designated target node affecting the browsing experience.

In one embodiment, the layout object node satisfying the recall rule is a node in the Layout Object tree of the page. In particular, step S61 may include the following steps.

In step S71, the attribute information of the layout object node satisfying the recall rule is obtained, and the attribute information is information obtained in the layout process. In step S72, a top-down feature calculation is performed on the layout object node satisfying the recall rule in the Layout Object tree in a depth-first traversal way, based on the attribute information, to obtain the node characteristic of the layout object node satisfying the recall rule.

In one embodiment, the node characteristic may be a specified dimension feature extracted and calculated from node visual information, the node content, the node structure, and the like. The specified dimension may be set according to actual calculation requirements, for example, the specified dimension is greater than or equal to 10, and the embodiments of the present disclosure do not specifically limit the specified dimension.

In this embodiment, when building the Layout Object tree, the top-down feature calculation can be used to calculate the node characteristic of each node up to a parent node, and in this mode, the feature calculation must be performed on almost all the nodes of the page. Since the normal nodes are filtered out through the recall rule when the nodes are laid out, the top-down feature calculation can be used to selectively calculate node characteristics for layout object nodes satisfying the recall rule (i.e., suspected target nodes) in the depth-first traversal way, thereby reducing the number of nodes for calculating characteristics and improving the speed of node characteristic calculation.

In one embodiment, the node prediction model is a model trained in advance by using labeled static page data rendered offline, and the node prediction model is a Gradient Boosted Decision Tree model having a specified depth and a specified number of decision trees.

For example, since the node characteristic processed by the browser kernel may dynamically change, when selecting training data, offline rendered static data may be labeled and a high-accuracy automatic labeling tool may be set to assist manual labeling, and the training data is finally obtained.

For example, the node prediction model obtained by machine learning includes the Gradient Boosted Decision Tree (GBDT). The GBDT model, the specified depth and the specified number of decision trees are obtained by training with the labeled data in advance, e.g., a model file having a depth of 4 and 100 trees is obtained, and then the model file is used directly to determine whether the layout object node satisfying the recall rule is the designated target node.

It should be understood that the depth of the node prediction model and the number of decision trees obtained by the above training are exemplary values. In practical application scenarios, the model training may be completed according to user's practical requirements, which is not specifically limited in the embodiments of the present disclosure.

In one embodiment, in step S140, the step of shielding the designated target node may specifically include the following steps.

In step S81, corresponding node characteristic information is calculated according to attribute information of the designated target node.

The node characteristic information includes at least one of a position in the page, a width, a height, whether the node being in subject content, or an area ratio of the node in the page.

In step S82, if the node characteristic information reaches a corresponding preset shielding threshold, the designated target node affecting the browsing experience is shielded by setting the designated target node to a hidden state.

The page processing method according to the embodiments of the present disclosure provides a shielding strategy of a target node, and the shielding strategy can adopt a targeted processing mechanism for the characteristic of the specified target node. After the target node is identified, the characteristic of the target node in the page and the area ratio of the target node in the entire page can be calculated, and then the target node can be shielded according to a configurable shielding threshold (e.g., the position of the node in the page, the width and the height of the node, whether the node being in the subject content, etc.), so as to achieve flexible shielding of the designated target node, maintain and ensure the ecological security of mobile search, and fully optimize the page browsing experience.

In this embodiment, the elements that affect the user's browsing experience are shielded, and after the page is rendered and drawn, the user sees the optimized page, which greatly improves the user's browsing experience and provides a guarantee for the ecological security of mobile search.

According to the page processing method provided by the embodiments of the present disclosure, the designated target node is shielded, e.g., the node state is set to hidden, the kernel layout state is reset, the kernel re-layout is initiated actively, and the entire page processing procedure occurs before the nodes are drawn, thereby ensuring that the user does not have any jitter perception about hiding the page node when browsing the page, and optimizing the overall page browsing experience.

Figure 4:
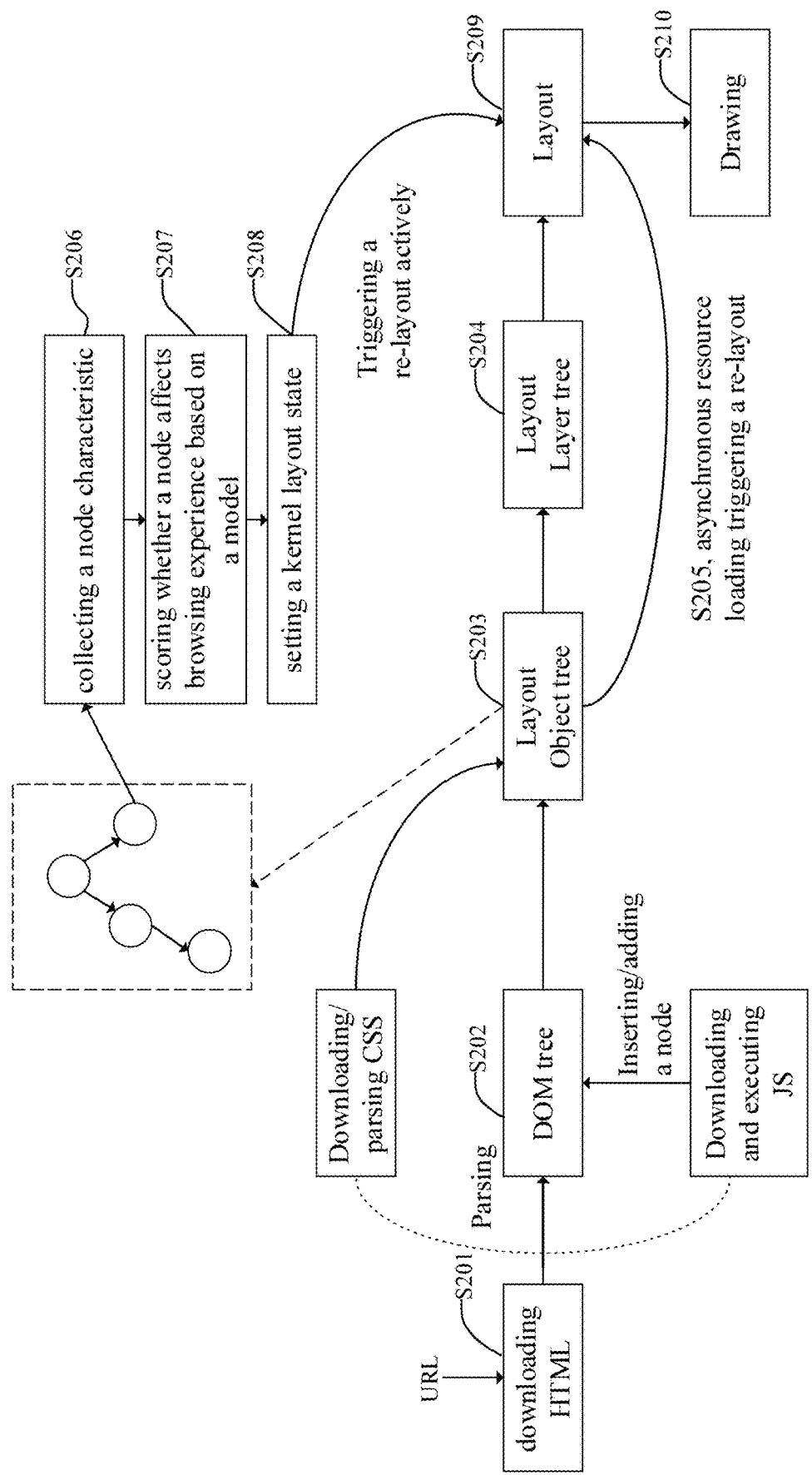
FIG. 4 is another flowchart of a page processing method according to an embodiment of the present disclosure.

In order to better understand the page processing method of the present disclosure, a page processing flow of another embodiment of the present disclosure is described below with reference to FIG. 4. FIG. 4 is another flowchart of a page processing method according to an embodiment of the present disclosure. As shown in FIG. 4, the page processing method may include the following steps.

In step S201, a Hypertext Markup Language (HTML) file is downloaded according to a URL of a page.

In step S202, the HTML file is parsed by a parser to obtain a DOM tree; and when a CSS and a JS file resource link on the HTML file are obtained by parsing, the CSS is downloaded and parsed, and a JS file is downloaded and executed.

In this step, the CSS is downloaded and parsed to obtain style data of nodes in the DOM tree; after the JS file is downloaded and executed, nodes dynamically loaded by JS may be obtained, and the dynamically loaded nodes may be inserted/added into the DOM tree.

In step S203, a Layout Object tree is constructed, according to HTML element nodes that need to be rendered in the DOM tree and the style data of the nodes in the DOM tree.

In step S204, after the Layout Object tree is constructed, a Layout Layer tree is created.

In this step, layer positioning and layout may be realized based on the Layout Layer tree.

In step S205, the nodes generated by the JS dynamic loading in the Layout Object tree are filtered, and step S209 is executed to trigger re-layout of the nodes generated by the dynamic loading.

In FIG. 4, since the JS dynamic loading is asynchronous resource loading, a process of re-layout of nodes generated by dynamic loading may also be referred as a node re-layout triggered by asynchronous resource loading.

In step S206, attribute information of layout object nodes is collected in the process of laying out the nodes in the Layout Object tree.

In step S207, it is scored whether a layout object node is a designated target node that affects the browsing experience, based on a preset node prediction model, and it is predicted whether the layout object node affects the browsing experience according to the scoring result.

In this step, the score of the layout object node is a probability value whether the layout object node is the designated target node that affects the browsing experience.

In some embodiments, after any node in the Layout Object tree is laid out, a preset recall rule may be used to filter the layout object node to obtain a layout object node in the Layout Object tree that satisfies the recall rule. Therefore, in the above step S207, based on the preset node prediction model, it is scored whether the layout object node that satisfies the recall rule is a designated target node that affects the browsing experience.

In step S208, if it is predicted that the layout object node is the designated target node that affects the browsing experience, a layout state is set by a browser kernel, and step S209 is executed, so as to actively trigger the re-layout of the layout object node.

In step S208, the designated target node may be shielded by re-laying out the designated target node (e.g., by setting a node state to hidden).

In step S209, the layout object node is re-laid out to obtain the re-laid layout object node after the shielding.

In step S210, the page is drawn based on the layout object node after the shielding, and the drawn page is displayed on a designated display screen.

According to the page processing method provided by the embodiments of the present disclosure, nodes to be rendered are filtered by combining the preprocessing based on the recall rule and strategies with the machine learning model, thereby shielding the elements in the page that affect the browsing experience.

Figure 5A:
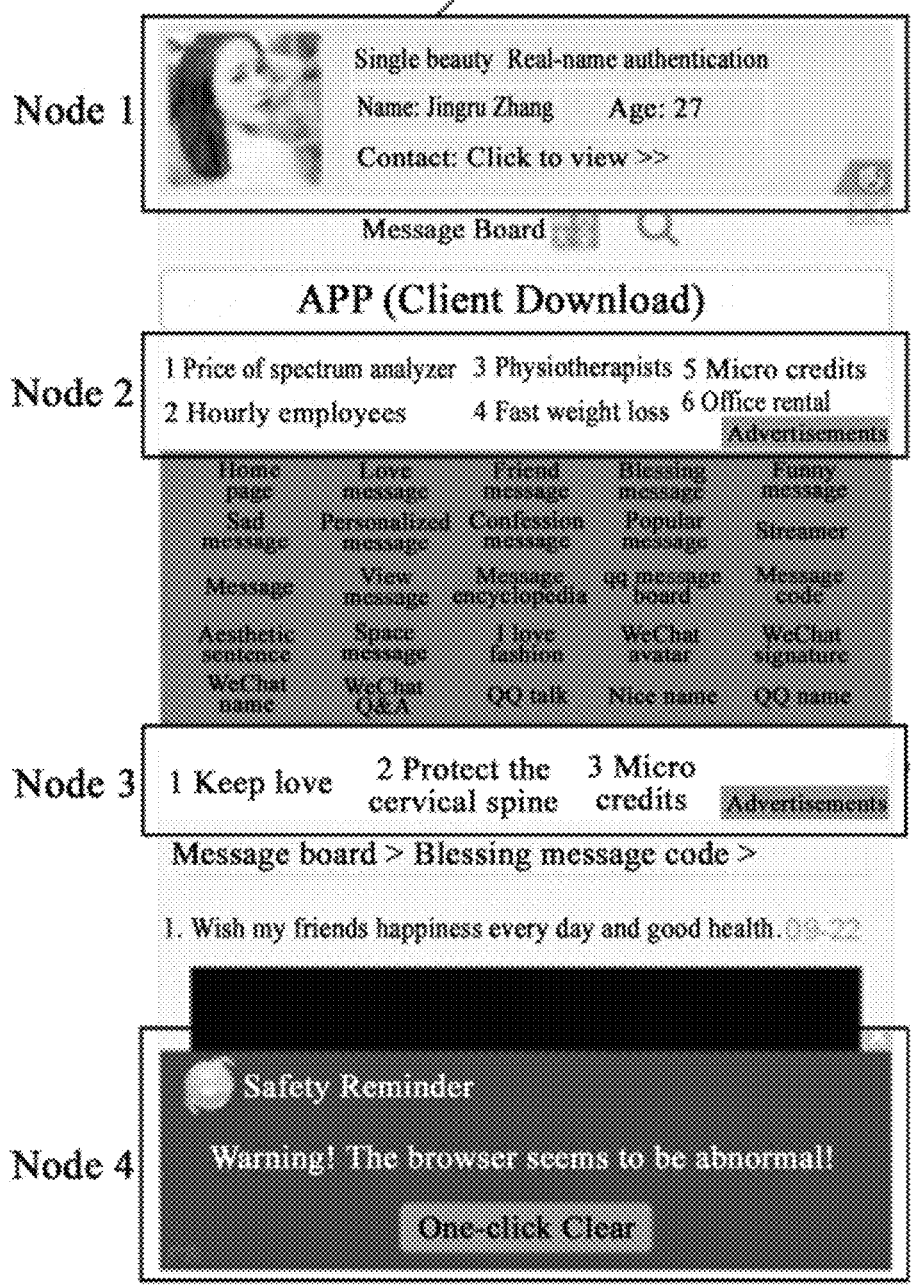
FIGS. 5a-5c are schematic diagrams of an effect of a page processing method according to the present disclosure.
Figure 5B:
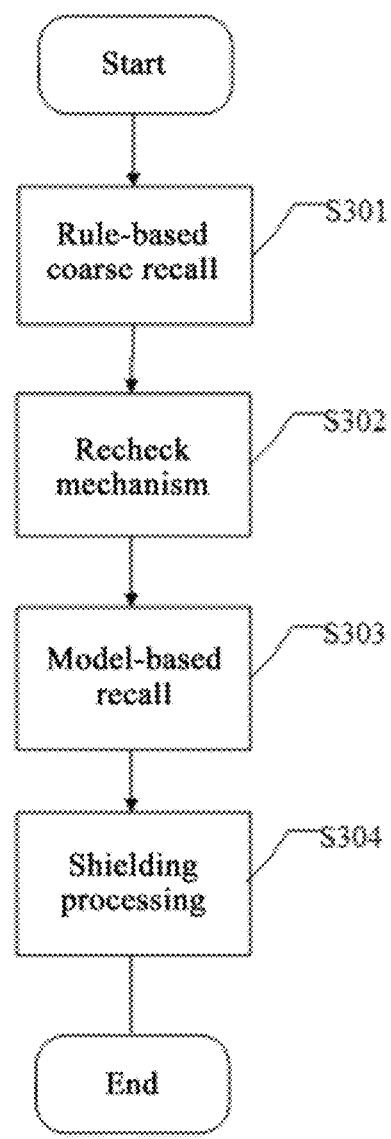
Figure 5C:

FIGS. 5a-5c are schematic diagrams of an effect of a page processing method according to the present disclosure. As shown in FIG. 5a, a page 1 includes a plurality of layout object nodes corresponding to a plurality of HTML object elements, such as a node 1, a node 2, a node 3, or a node 4.

In FIG. 5a, when each layout object node in the page 1 is laid out, its own layout method will be called to avoid traversing the DOM tree. For each layout object node, the following steps may be performed.

As shown in S301 "Rule-based coarse recall" in FIG. 5b, after a plurality of layout object nodes of a page are laid out, the layout object nodes are filtered according to a preset recall rule, and a layout object node in the page that satisfies the recall rule is obtained.

Step S301 has the same processing procedure as step S120 in the above-mentioned embodiment, which will not be repeated in the embodiments of the present disclosure.

As shown in S302 "Recheck mechanism" in FIG. 5b, after all the layout object nodes in the page have been laid out, the preset recall rule is used again to filter a layout object node of which the node state has changed.

Step S302 has the same processing procedure as step S53 in the above-mentioned embodiment, which will not be repeated in the embodiments of the present disclosure.

As shown in S303 "Model-based recall" in FIG. 5b, based on a preset node prediction model, it is predicted whether the layout object node that satisfies the recall rule is a designated target node.

Step S303 has the same processing procedure as step S130 in the above-mentioned embodiment, which will not be repeated in the embodiments of the present disclosure.

As shown in S304 "Shielding processing" in FIG. 5b, the designated target node is shielded, and the layout target node after the shielding is used to generate a page after the shielding.

Step S304 has the same processing procedure as step S140 in the above-mentioned embodiment, which will not be repeated in the embodiments of the present disclosure.

As shown in FIG. 5c, after the page 1 is rendered, what a user sees is an optimized page 2, which greatly improves the user's browsing experience and provides a guarantee for the ecological security of mobile search.

Figure 6:
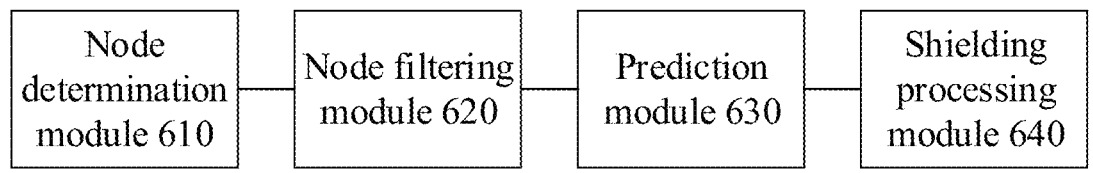
FIG. 6 is a block diagram of a page processing device according to an embodiment of the present disclosure.

FIG. 6 is a block diagram of a page processing device according to an embodiment of the disclosure. As shown in FIG. 6, the page processing device includes the following modules.

A node determination module 610 is configured to determine a plurality of layout object nodes of a page, according to an obtained Hypertext Markup Language (HTML) file.

A node filtering module 620 is configured to filter the plurality of layout object nodes according to a preset recall rule to obtain a layout object node satisfying the recall rule, after laying out the plurality of layout object nodes of the page.

A prediction module 630 is configured to predict whether the layout object node satisfying the recall rule is a designated target node.

In some embodiments, the prediction module 630 is configured to predict whether the layout object node satisfying the recall rule is the designated target node based on a preset node prediction model.

A shielding processing module 640 is configured to shield the designated target node, and generate a shielded page based on remaining layout target nodes after the shielding.

According to the page processing device provided by the embodiments of the present disclosure, page content displayed on a website can be filtered, which provides a guarantee for the ecological security of mobile search, thereby improving the user's browsing experience.

In one embodiment, the node determination module 610 may include the following units.

A first parsing unit is configured to parse the HTML file to obtain a Document Object Model (DOM) and a Cascading Style Sheets (CSS). A second parsing unit is configured to parse the CSS to obtain style data of an HTML element node in the DOM. The node determination module 610 is specifically configured to determine the plurality of layout object nodes of the page according to HTML element nodes in the DOM that need to be rendered and their style data.

Each layout object node corresponds to an HTML element node that needs to be rendered, and the style data of each layout object node is identical to that of the corresponding HTML element node.

In one embodiment, if the HTML file is parsed and a script file link is obtained, the node determination module 610 may further include: a download execution unit configured to download and execute a script file corresponding to the script file link to obtain an HTML element node corresponding to the script file. The node determination module 610 is specifically configured to determine the HTML element node corresponding to the script file as the layout object node satisfying the recall rule.

In one embodiment, the node filtering module 620 may be further configured to: after the plurality of layout object nodes of the page are determined, if the plurality of layout object nodes include a layout object node loaded through a script file, determine the layout object node loaded through the script file as the layout object node satisfying the recall rule.

In one embodiment, the node filtering module 620 may further include: an attribute information acquisition unit configured to lay out any layout object node of the page to obtain attribute information of the layout object node that has been laid out; a condition-satisfying judging unit configured to determine whether the attribute information satisfies a node recall condition defined in the recall rule; and a recall node determination unit configured to determine a layout object node satisfying the node recall condition as the layout object node satisfying the recall rule.

In one embodiment, the recall rule may include: a rule preset according to at least one of a node width and height ratio, a node embedded form, a node location characteristic, node content, a node generation mechanism, or a node structure.

In one embodiment, the page processing device may further include: a node state determination module configured to determine the layout object node satisfying the recall rule as a layout object node obtained through an initial filtering, and determine a node state of the layout object node obtained through the initial filtering; a state-change node acquisition module configured to obtain a layout object node of which the node state has changed, after all the layout object nodes of the page are laid out; a node re-filtering module configured to further filter the layout object node of which the node state has changed according to the preset recall rule; and a filtered node determination module configured to determine the layout object node obtained through the initial filtering and a layout object node obtained through the further filtering as the layout object node satisfying the recall rule.

In one embodiment, the prediction module 630 may include: a feature calculation unit configured to calculate a node characteristic of the layout object node satisfying the recall rule, according to attribute information of the layout object node satisfying the recall rule; a probability calculation unit configured to process the node characteristic by using a preset node prediction model, to obtain a probability value that the layout object node satisfying the recall rule is the designated target node; and a target node determination unit configured to determine whether the layout object node satisfying the recall rule is the designated target node according to the probability value.

In one embodiment, the layout object node satisfying the recall rule is a node in a Layout Object tree of the page.

In this embodiment, the feature calculation unit may include: an attribute information collection subunit configured to obtain the attribute information of the layout object node satisfying the recall rule, the attribute information being information obtained in the layout process. The feature calculation unit is specifically configured to perform a top-down feature calculation on the layout object node satisfying the recall rule in the Layout Object tree in a depth-first traversal way, based on the attribute information, to obtain the node characteristic of the layout object node satisfying the recall rule.

In one embodiment, the node prediction model is a model trained in advance by using labeled static page data rendered offline, and the node prediction model is a Gradient Boosted Decision Tree model having a specified depth and a specified number of decision trees.

In one embodiment, the shielding processing module 640 may specifically include: a characteristic calculation unit configured to calculate corresponding node characteristic information according to attribute information of the designated target node, the node characteristic information including at least one of a position in the page, a width, a height, whether the node being in subject content, or an area ratio of the node in the page; and a node shielding unit configured to, if the node characteristic information reaches a corresponding preset shielding threshold, shield the designated target node by setting the designated target node to a hidden state.

In one embodiment, the shielding processing module 640 may specifically further include: a drawing unit configured to re-layout the remaining layout target nodes after the shielding, and draw the shielded page according to the layout object node that have been re-laid out.

According to the page processing device provided by the embodiments of the present disclosure, the designated target node is shielded by combining a rule recall and a model prediction, and the entire page processing procedure occurs before the nodes are drawn, thereby ensuring that the user does not have any jitter perception about hiding the page node when browsing the page, and optimizing the overall page browsing experience.

Figure 7:
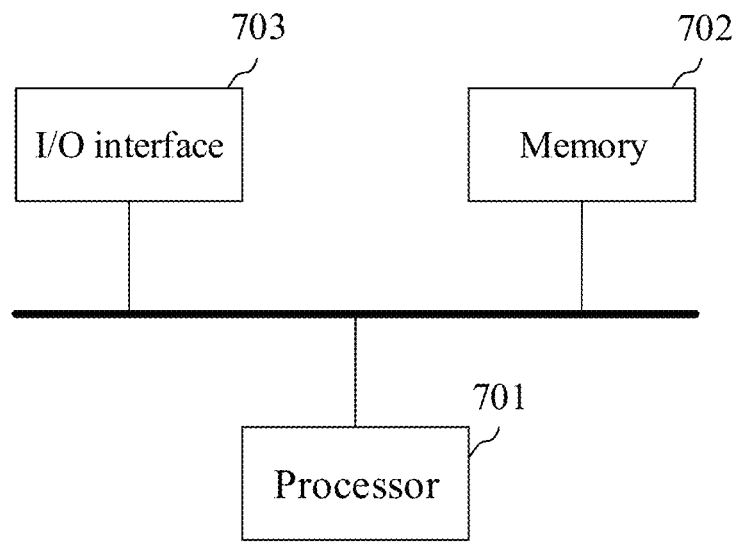
FIG. 7 is a block diagram of an electronic apparatus according to an embodiment of the present disclosure.

FIG. 7 is a block diagram of an electronic apparatus according to an embodiment of the present disclosure. As shown in FIG. 7, according to the embodiments of the present disclosure, provided is an electronic apparatus 700 including: at least one processor 701;

a memory 702 storing at least one program thereon, when the at least one program is executed by the at least one processor, the at least one processor implements any one of the above-mentioned page processing methods; and at least one I/O interface 703 connected between the at least one processor and the memory, and configured to implement information interaction between the at least one processor and the memory.

The processor 701 is a device having a data processing capability, and includes, but is not limited to, a central processing unit (CPU) and the like. The memory 702 is a device having a data storage capability, and includes, but is not limited to, a random access memory (RAM, more specifically, such as a synchronous dynamic RAM (SDRAM), a double data rate SDRAM (DDR SDRAM), etc.), a read only memory (ROM), an electrically erasable programmable read only memory (EEPROM), and a flash memory (FLASH). The I/O interface (read/write interface) 703 is connected between the processor 701 and the memory 702, enables the information interaction between the processor 701 and the memory 702, and includes, but is not limited to, a data bus etc.

In some embodiments, the processor 701, the memory 702, and the I/O interface 703 are connected to each other through a bus, so as to be further connected to other components of the electronic apparatus 700.

Figure 8:
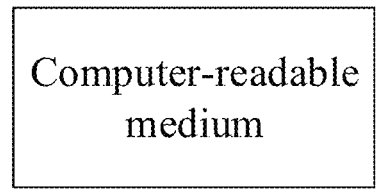
FIG. 8 is a block diagram of a computer-readable medium according to an embodiment of the present disclosure.

FIG. 8 is a block diagram of a computer-readable medium according to an embodiment of the present disclosure. As shown in FIG. 8, according to the embodiments of the present disclosure, provided is a computer-readable medium storing a computer program thereon. When the computer program is executed by a processor, any one of the above-mentioned page processing methods is implemented.

It should be understood by those having ordinary skill in the art that the functional modules/units in all or some of the steps, systems, and devices in the method disclosed above may be implemented as software, firmware, hardware, or suitable combinations thereof. If implemented as hardware, the division between the functional modules/units stated above does not necessarily correspond to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those having ordinary skill in the art, the term "computer storage media" includes volatile/nonvolatile and removable/non-removable media used in any method or technology for storing information (such as computer-readable instructions, data structures, program modules and other data). The computer storage media include, but are not limited to, RAM, ROM, EEPROM, flash memory or other memory techniques, CD-ROM, digital versatile disk (DVD) or other optical discs, magnetic cassette, magnetic tape, magnetic disk or other magnetic storage devices, or any other media which can be used to store the desired information and can be accessed by a computer. In addition, it is well known by those having ordinary skill in the art that the communication media generally include computer-readable instructions, data structures, program modules or other data in a modulated data signal, such as a carrier wave or other transmission mechanism, and may include any information delivery media.

It should be understood that both the exemplary embodiments and the specific terms disclosed in the present disclosure are for the purpose of illustration, rather than for limiting the present disclosure. It is obvious to those having ordinary skill in the art that the features, characteristics and/or elements described in connection with a particular embodiment may be used alone or in combination with the features, characteristics and/or elements described in connection with other embodiments, unless expressly indicated otherwise. Therefore, it should be understood by those having ordinary skill in the art that various changes in form and detail may be made without departing from the scope of the present disclosure as set forth in the appended claims.

The invention claimed is:

1. A page processing method, comprising:
   determining a plurality of layout object nodes of a page, according to an obtained Hypertext Markup Language (HTML) file;
   filtering the plurality of layout object nodes according to a preset recall rule to obtain a layout object node satisfying the recall rule, after laying out the plurality of layout object nodes of the page;
   predicting whether the layout object node satisfying the recall rule is a designated target node; and
   shielding the designated target node, and generating a shielded page based on remaining layout target nodes after the shielding,
   wherein predicting whether the layout object node satisfying the recall rule is the designated target node comprises:
   calculating a node characteristic of the layout object node satisfying the recall rule, according to attribute information of the layout object node satisfying the recall rule, wherein the node characteristic is a feature having specified number of dimensions extracted and calculated from the attribute information of the layout object node, the specified number of dimensions is greater than or equal to 10;
   processing the node characteristic by using a preset node prediction model, to obtain a probability value of the layout object node satisfying the recall rule being the designated target node; and determining whether the layout object node satisfying the recall rule is the designated target node according to the probability value.

2. The method according to claim 1, after determining the plurality of layout object nodes of the page, further comprising:
   determining a layout object node loaded through a script file as the layout object node satisfying the recall rule, in response to determining that the plurality of layout object nodes comprise the layout object node loaded through the script file.

3. The method according to claim 1, wherein filtering the plurality of layout object nodes according to the preset recall rule to obtain the layout object node satisfying the recall rule among the plurality of layout object nodes, after laying out the plurality of layout object nodes of the page, comprises:
   laying out the plurality of layout object nodes of the page, to obtain attribute information of the layout object nodes having been laid out;
   determining whether the attribute information satisfies a node recall condition defined in the recall rule; and
   determining a layout object node satisfying the node recall condition as the layout object node satisfying the recall rule.

4. The method according to claim 3, wherein
   the recall rule comprises a rule preset according to at least one of a node width and height ratio, a node embedded form, a node location characteristic, node content, a node generation mechanism, or a node structure.

5. The method according to claim 1, before predicting whether the layout object node satisfying the recall rule is the designated target node, further comprising:
   determining the layout object node satisfying the recall rule as a layout object node obtained through an initial filtering, and determining a node state of the layout object node obtained through the initial filtering;
   obtaining a layout object node having a changed node state, after all the layout object nodes of the page being laid out;
   further filtering the layout object node having the changed node state according to the preset recall rule; and
   determining the layout object node obtained through the initial filtering and a layout object node obtained through the further filtering, as the layout object node satisfying the recall rule.

6. The method according to claim 1, wherein the layout object node satisfying the recall rule is a node in a Layout Object tree of the page; and
   calculating the node characteristic of the layout object node satisfying the recall rule, according to the attribute information of the layout object node satisfying the recall rule, comprises:
   obtaining the attribute information of the layout object node satisfying the recall rule, the attribute information being information obtained in a layout process; and
   performing a top-down feature calculation on the layout object node satisfying the recall rule in the Layout Object tree in a depth-first traversal way, based on the attribute information, to obtain the node characteristic of the layout object node satisfying the recall rule.

7. The method according to claim 1, wherein,
   the preset node prediction model is a model trained in advance by using labeled static page data rendered offline, and the node prediction model is a Gradient Boosted Decision Tree model having a specified depth and a specified number of decision trees.

8. The method according to claim 1, wherein shielding the designated target node comprises:
   calculating corresponding node characteristic information according to attribute information of the designated target node, the node characteristic information comprising at least one of a position in the page, a width, a height, whether being in subject content, or an area ratio in the page; and
   shielding the designated target node by setting the designated target node to a hidden state, in response to determining that the node characteristic information reaches a corresponding preset shielding threshold.

9. An electronic apparatus, comprising:
   at least one processor;
   a memory storing at least one program thereon; and
   at least one I/O interface connected between the at least one processor and the memory, and configured to implement information interaction between the at least one processor and the memory;
   wherein when the at least one program is executed by the at least one processor, the at least one processor implements:
   determining a plurality of layout object nodes of a page, according to an obtained Hypertext Markup Language (HTML) file;
   filtering the plurality of layout object nodes according to a preset recall rule to obtain a layout object node satisfying the recall rule, after laying out the plurality of layout object nodes of the page;
   predicting whether the layout object node satisfying the recall rule is a designated target node; and
   shielding the designated target node, and generating a shielded page based on remaining layout target nodes after the shielding,
   wherein predicting whether the layout object node satisfying the recall rule is the designated target node comprises:
   calculating a node characteristic of the layout object node satisfying the recall rule, according to attribute information of the layout object node satisfying the recall rule, wherein the node characteristic is a feature having specified number of dimensions extracted and calculated from the attribute information of the layout object node, the specified number of dimensions is greater than or equal to 10;
   processing the node characteristic by using a preset node prediction model, to obtain a probability value of the layout object node satisfying the recall rule being the designated target node; and
   determining whether the layout object node satisfying the recall rule is the designated target node according to the probability value.

10. The apparatus according to claim 9, wherein after determining the plurality of layout object nodes of the page, the at least one processor is further configured to:
    determine a layout object node loaded through a script file as the layout object node satisfying the recall rule, in response to determining that the plurality of layout object nodes comprise the layout object node loaded through the script file.

11. The apparatus according to claim 9, wherein the at least one processor is further configured to:
    lay out the plurality of layout object nodes of the page, to obtain attribute information of the layout object nodes having been laid out;
    determine whether the attribute information satisfies a node recall condition defined in the recall rule; and determine a layout object node satisfying the node recall condition as the layout object node satisfying the recall rule.

12. The apparatus according to claim 11, wherein
the recall rule comprises a rule preset according to at least one of a node width and height ratio, a node embedded form, a node location characteristic, node content, a node generation mechanism, or a node structure.

13. The apparatus according to claim 9, wherein before predicting whether the layout object node satisfying the recall rule is the designated target node, the at least one processor is further configured to:
determine the layout object node satisfying the recall rule as a layout object node obtained through an initial filtering, and determine a node state of the layout object node obtained through the initial filtering;
obtain a layout object node having a changed node state, after all the layout object nodes of the page being laid out;
further filter the layout object node having the changed node state according to the preset recall rule; and
determine the layout object node obtained through the initial filtering and a layout object node obtained through the further filtering, as the layout object node satisfying the recall rule.

14. The apparatus according to claim 9, wherein the layout object node satisfying the recall rule is a node in a Layout Object tree of the page; and
the at least one processor is further configured to:
obtain the attribute information of the layout object node satisfying the recall rule, the attribute information being information obtained in a layout process; and
perform a top-down feature calculation on the layout object node satisfying the recall rule in the Layout Object tree in a depth-first traversal way, based on the attribute information, to obtain the node characteristic of the layout object node satisfying the recall rule.

15. The apparatus according to claim 9, wherein
the preset node prediction model is a model trained in advance by using labeled static page data rendered offline, and the node prediction model is a Gradient Boosted Decision Tree model having a specified depth and a specified number of decision trees.

16. The apparatus according to claim 9, wherein the at least one processor is further configured to:
calculate corresponding node characteristic information according to attribute information of the designated target node, the node characteristic information comprising at least one of a position in the page, a width, a height, whether being in subject content, or an area ratio in the page; and shield the designated target node by setting the designated target node to a hidden state, in response to determining that the node characteristic information reaches a corresponding preset shielding threshold.

17. A non-transitory computer-readable storage medium storing a computer program thereon, wherein the computer program is executed by a processor to cause the processor to implement:
determining a plurality of layout object nodes of a page, according to an obtained Hypertext Markup Language (HTML) file;
filtering the plurality of layout object nodes according to a preset recall rule to obtain a layout object node satisfying the recall rule, after laying out the plurality of layout object nodes of the page;
predicting whether the layout object node satisfying the recall rule is a designated target node; and
shielding the designated target node, and generating a shielded page based on remaining layout target nodes after the shielding,
wherein predicting whether the layout object node satisfying the recall rule is the designated target node comprises:
calculating a node characteristic of the layout object node satisfying the recall rule, according to attribute information of the layout object node satisfying the recall rule, wherein the node characteristic is a feature having specified number of dimensions extracted and calculated from the attribute information of the layout object node, the specified number of dimensions is greater than or equal to 10;
processing the node characteristic by using a preset node prediction model, to obtain a probability value of the layout object node satisfying the recall rule being the designated target node; and
determining whether the layout object node satisfying the recall rule is the designated target node according to the probability value.

18. The non-transitory computer-readable storage medium of claim 17, wherein after determining the plurality of layout object nodes of the page, the computer program is executed by the processor to cause the processor to:
determine a layout object node loaded through a script file as the layout object node satisfying the recall rule, in response to determining that the plurality of layout object nodes comprise the layout object node loaded through the script file.

* * * * *